(12) United States Patent
Velpari et al.

(10) Patent No.: US 8,721,777 B2
(45) Date of Patent: May 13, 2014

(54) FILTRATION MEDIA AND APPLICATIONS THEREOF

(75) Inventors: Vedagiri Velpari, Monroeville, PA (US); Jian Meng, Gastonia, NC (US); Paul A. Westbrook, Shelby, NC (US); Timothy E. Marsh, Allison Park, PA (US); Steven Joel Parks, Lexington, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 294 days.

(21) Appl. No.: 13/218,816

(22) Filed: Aug. 26, 2011

(65) Prior Publication Data

US 2012/0067220 A1 Mar. 22, 2012

Related U.S. Application Data

(60) Provisional application No. 61/377,305, filed on Aug. 26, 2010.

(51) Int. Cl.
*B01D 53/02* (2006.01)

(52) U.S. Cl.
USPC .............................................. 96/154; 96/134

(58) Field of Classification Search
USPC .................................. 96/134, 154
See application file for complete search history.

(56) References Cited

U.S. PATENT DOCUMENTS

| | | | |
|---|---|---|---|
| 4,250,172 A * | 2/1981 | Mutzenberg et al. | ............. 442/6 |
| 4,444,574 A | 4/1984 | Tradewell et al. | |
| 4,917,862 A | 4/1990 | Kraw et al. | |
| 5,505,766 A | 4/1996 | Chang | |
| 5,948,143 A | 9/1999 | Sjostrom et al. | |
| 6,258,334 B1 | 7/2001 | Gadkaree et al. | |
| 6,395,073 B1 | 5/2002 | Dauber | |
| 6,521,021 B1 | 2/2003 | Pennline et al. | |
| 6,576,092 B2 | 6/2003 | Granite et al. | |
| 6,740,142 B2 | 5/2004 | Buettner et al. | |
| 6,953,494 B2 * | 10/2005 | Nelson, Jr. | ...................... 95/134 |
| 7,033,419 B1 | 4/2006 | Granite et al. | |
| 7,318,852 B2 | 1/2008 | Chung et al. | |
| 7,494,632 B1 | 2/2009 | Klunder | |
| 8,034,741 B2 | 10/2011 | Durante et al. | |

(Continued)

FOREIGN PATENT DOCUMENTS

| | | |
|---|---|---|
| DE | 203 19 676 U1 | 1/2005 |
| DE | 20 2005 018 547 U1 | 12/2006 |

(Continued)

OTHER PUBLICATIONS

Patent Cooperation Treaty, International Preliminary Report on Patentability, International Application No. PCT/US2011/049323, mailed Mar. 7, 2013.

(Continued)

*Primary Examiner* — Christopher P Jones
(74) *Attorney, Agent, or Firm* — Andrew C. Siminerio

(57) ABSTRACT

In some embodiments, the present invention provides filtration media for the treatment of flue gas streams and methods of making and using the same. In one embodiment, a filtration medium comprises a pollutant absorbent layer comprising a plurality of activated carbon fibers, a first woven fabric, and a second woven fabric, wherein the pollutant absorbent layer is positioned between the first woven fabric and the second woven fabric.

34 Claims, 3 Drawing Sheets

(56) References Cited

U.S. PATENT DOCUMENTS

| | | | |
|---|---|---|---|
| 8,057,576 B1 * | 11/2011 | Pollack | 95/108 |
| 2002/0073849 A1 | 6/2002 | Buettner et al. | |
| 2004/0237790 A1 * | 12/2004 | von Blucher et al. | 96/154 |
| 2005/0081717 A1 | 4/2005 | Meiller et al. | |
| 2005/0148465 A1 | 7/2005 | Durante et al. | |
| 2005/0252379 A1 * | 11/2005 | von Blucher | 96/154 |
| 2006/0029533 A1 | 2/2006 | DeBerry | |
| 2007/0056478 A1 | 3/2007 | Miller et al. | |
| 2007/0104631 A1 | 5/2007 | Durante et al. | |
| 2007/0167309 A1 | 7/2007 | Olson | |
| 2008/0006012 A1 | 1/2008 | Friday et al. | |
| 2008/0227415 A1 | 9/2008 | Harel et al. | |
| 2008/0274312 A1 | 11/2008 | Schelling et al. | |
| 2010/0095843 A1 * | 4/2010 | Gebert et al. | 95/134 |
| 2010/0104487 A1 | 4/2010 | Smid et al. | |

FOREIGN PATENT DOCUMENTS

| | | |
|---|---|---|
| EP | 0 230 097 A2 | 7/1987 |
| WO | WO 2007/056478 A1 | 5/2007 |
| WO | WO 2009/012189 A2 | 1/2009 |

OTHER PUBLICATIONS

Durante, V. et al., A Novel Technology to Immobilize Mercury from Flue Gases, Paper # 232, Proceedings: The Mega Symposium—May 19-22, 2003 Washington, DC.

Feeley, T. et al., DOE/NETL's Mercury Control Technology research Program for Coal-Fired Power Plants, EM Feature, Oct. 2004. pp. 16-23.

Granite, E. et al., Effects of Photochemical Formation of Mercuric Oxide, Ind. Eng. Chem. Res., 1999, vol. 38, 5034-5037.

Granite, E. et al., Photochemical Removal of Mercury from Flue Gas, Ind. Eng. Chem. Res., 2002, vol. 41, pp. 5470-5476.

Granite, E. et al., Separations: Novel Sorbents for Mercury Removal from Flue Gas, Ind. Eng. Chem. Res., 2000, vol. 39, pp. 1020-1029.

Granite, E. et al., Research Notes: Sorbents for Mercury Capture from Fuel Gas with Application to Gasification Systems, Ind. Eng. Chem. Res., 2006, vol. 45, pp. 4844-4848.

Granite, E. et al., Short Communication: The Thief Process for Mercury Removal from Flue Gas, J. Envir, Manag., 2007, vol. 84, pp. 628-634.

Manivannan, A. et al., Mercury Detection at Boron Doped Diamond Electrodes using a Rotating Disk Technique, Journal of Electroanalytical Chemistry, 2005, vol. 577, pp. 287-293.

McLarnon, C. et al., The PCO Process for Photochemical Removal of Mercury from Flue Gas, Fuel Processing Technology, 2005, vol. 87, pp. 85-89.

Maroto-Valer, M. et al., Effect of Porous Structure and Surface Functionality on the Mercury Capacity of a Fly Ah Carbon and its Activated Sample, Fuel, 2005, vol. 84, pp. 105-108.

O'Dowd, W. et al., Recent Advances in Mercury Removal Technology at the National Energy Technology Laboratory, Fuel Processing Technology, 2004, vol. 85, pp. 533-548.

O'Dowd, W. et al., A Technique to Control Mercury from Flue Gas: The Thief Process, Fuel Processing Technology, 2006, vol. 87, pp. 1071-1084.

Poulston, S. et al., Metal Sorbents for High Temperature Mercury Capture from Fuel Gas, Fuel, 2007, vol. 86, pp. 2201-2203.

Presto, A. et al., Critical Review: Survey of Catalysts for Oxidation of Mercury in Flue Gas, Environmental Science and Technology, 2006, vol. 40, No. 18, pp. 5601-5609.

Presto, A. et al., A Kinetic Approach to the Catalytic Oxidation of Mercury in Flue Gas, Energy and Fuels, 2006, vol. 20, pp. 1941-1945.

Presto, A. et al., Impact of Sulfur Oxides on Mercury Capture by Activated Carbon, Environmental Science and Technology, 2007, pp. A-F.

R&D Facts: Trace Metal Capture Laboratories, Environmental Science, 2007.

Patent Cooperation Treaty, Partial International Search Report, International Application No. PCT/US2011/049323, mailed Jan. 5, 2012.

Patent Cooperation Treaty, International Search Report, International Application No. PCT/US2011/049323, mailed Apr. 3, 2012.

United States Patent and Trademark Office, Office Action, U.S. Appl. No. 13/182,975 mailed May 23, 2013.

United States Patent and Trademark Office, Response to Restriction Requirement, U.S. Appl. No. 13/182,975, filed Jun. 24, 2013.

United States Patent and Trademark Office, Office Action, U.S. Appl. No. 13/182,975 mailed Jul. 22, 2013.

United States Patent and Trademark Office, Amendment and Response to Office Action, U.S. Appl. No. 13/182,975, filed Nov. 25, 2013.

* cited by examiner

FILTRATION MEDIA AND APPLICATIONS THEREOF

CROSS REFERENCE TO RELATED APPLICATION

This application claims priority to U.S. Provisional Patent Application Ser. No. 61/377,305, filed on Aug. 26, 2010, the entire disclosure of which is hereby incorporated by reference.

FIELD OF THE INVENTION

The present invention relates to filtration media and, in particular, to filtration media used in flue gas applications.

BACKGROUND

The hazards of nitrogen oxides, mercury and other compounds present in flue gases have resulted in the imposition of strict standards limiting discharges of such chemical species. To meet these standards, it is necessary to remove a significant portion of nitrogen oxides, mercury and/or other chemical species present in exhaust gases from stationary or mobile combustion sources.

Denitrification or selective catalytic reduction (SCR) technology is commonly applied to combustion-derived flue gases for the removal of nitrogen oxides when passed through a catalytic reactor. SCR technology has progressed to where substantially all nitrogen oxides can be removed from a flue gas.

Effective and efficient removal of mercury from flue gases, however, has become increasingly difficult. Elemental mercury in flue gases does not adhere well to soot and/or other particulates making collection by conventional particulate collection methods, such as electrostatic precipitators, dust filters and scrubbers, difficult. Moreover, the environmentally demanding and destructive conditions associated with flue gas filtration and treatment render many mercury absorbing materials unsuitable for use in industrial processes such as pulse jet or reverse air applications.

SUMMARY OF THE INVENTION

In one aspect a filtration medium is provided. The filtration medium comprises a pollutant absorbent layer comprising a plurality of activated carbon fibers, a first woven fabric, a second woven fabric, wherein the pollutant absorbent layer is positioned between the first woven fabric and the second woven fabric.

In one aspect, the pollutant absorbent layer is coupled to the first woven fabric and the second woven fabric. In another aspect, the pollutant absorbent layer is needled to the first woven fabric and the second woven fabric. In one aspect, the pollutant absorbent layer is coupled to the first woven fabric by a first adhesive layer.

In one aspect, the adhesive layer at least partially coats the first woven fabric, the second woven fabric, or combinations thereof. In another aspect, the adhesive layer is partially cured.

In one aspect, the pollutant absorbent layer is coupled to the second woven fabric by a second adhesive layer. In another aspect, the pollutant absorbent layer is stitch bonded to the first woven fabric, the second woven fabric, or combinations thereof. In one aspect, the pollutant absorbent layer is stitch bonded to the first woven fabric, the second woven fabric, or combinations thereof using at least one stitch yarn.

In one aspect, the at least one stitch yarn comprises polyester yarn, textured polyester yarn, textured polypropylene yarn, untextured polypropylene yarn, textured nylon yarn, untextured nylon yarn, fiber glass, polyaromatic amide, carbon fiber glass, textured fiber glass, or combinations thereof.

In one aspect, the pollutant absorbent layer is coupled to the first woven fabric by an adhesive layer, needling, stitch bonding, or combinations thereof. In an another aspect, the pollutant absorbent layer is coupled to the second woven fabric by an adhesive layer, needling, stitch bonding, or combinations thereof.

In one aspect, the first woven fabric and the second woven fabric comprise glass fibers, synthetic polymeric fibers, inorganic fibers, natural fibers, or combinations thereof.

In one aspect, the first woven fabric and the second woven fabric independently comprise E-glass fibers, C-glass fibers, ECR glass fibers, S-glass fibers, boron-free glass fibers, or mixtures thereof.

In one aspect, one or more fibers from the second woven fabric penetrate into the pollutant absorbent layer.

In one aspect, one or more fibers from the second woven fabric penetrate through the pollutant absorbent layer and into the first woven fabric. In another aspect, one or more fibers of the second woven fabric penetrate through the pollutant absorbent layer and first woven fabric and protrude from the exterior surface of the first woven fabric.

In one aspect, the first woven fabric or the second woven fabric has a thickness up to about 0.2 inches. In one aspect, the first woven fabric or the second woven fabric has a permeability of at least about 20 cfm/ft$^2$ according to ASTM D737. In one aspect, the first woven fabric or the second woven fabric has a Mullen Burst Strength of at least 100 pounds per square inch according to ASTM D3786. In another aspect, the first woven fabric or the second woven fabric has a Mullen Burst Strength of up to 900 pounds per square inch according to ASTM D3786.

In one aspect, the activated carbon fibers comprise synthetic polymeric fibers, natural fibers, or combinations thereof. In one aspect, the synthetic polymeric fibers comprise polyacrylonitrile fibers, phenolic fibers, polyvinyl alcohol fibers, or combinations thereof. In one aspect, the natural fibers comprise cellulosic fibers or rayon precursors. In another aspect, the activated carbon fibers are partially carbonized.

In one aspect, the pollutant absorbent layer further comprises metal halide salts, metal hydroxides, inorganic acids, noble metals, or combinations thereof. In one aspect, the pollutant absorbent layer comprises metal halide salt and the metal halide salt comprises zinc chloride, zinc bromide, or combinations thereof. In one aspect, the zinc chloride or zinc bromide is present in amount ranging from about 0.25 to about 6 weight percent zinc.

In one aspect, the pollutant absorbent layer comprises metal halide salt and wherein the metal halide salt comprises potassium chloride, potassium bromide, potassium iodide, or combinations thereof. In one aspect, the activated carbon fibers have an average diameter of up to about 50 μm. In another aspect, the activated carbon fibers have an average diameter of at least about 100 nm.

In one aspect, the activated carbon fibers further comprise at least one mercury retention species. In one aspect, the at least one mercury retention species comprises sulfur or a halogen. In another aspect, the mercury retention species comprises iodine, bromine, or chlorine. In one aspect, the mercury retention species comprises bromine. In one aspect, the mercury retention species is present in an amount of at least 1 weight percent. In another aspect, the mercury retention species is present in an amount of at least 5 weight percent.

In one aspect, the pollutant absorbent layer has a surface area of at least about 150 $m^2$/g as measured by ASTM D6556-10. In another aspect, the pollutant absorbent layer has a surface area of at least about 1000 $m^2$/g as measured by ASTM D6556-10.

In one aspect, the pollutant absorbent layer absorbs at least about 50 mg of mercury per gram of activated carbon fiber at room temperature in saturated mercury vapor. In another aspect, the pollutant absorbent layer absorbs at least about 100 mg of mercury per gram of activated carbon fiber at room temperature in saturated mercury vapor. In one aspect, the pollutant absorbent layer has a permeability of at least about 20 cfm/$ft^2$ according to ASTM D737.

In one aspect, the filtration medium comprises a fluid inlet surface and a fluid outlet surface, and wherein at least one of the fluid inlet surface and the fluid outlet surface further comprises a coating. In one aspect, the coating comprises a non-stick coating. In another aspect, the coating comprises at least one urethane, at least one silicone, at least one fluorocarbon, at least one epoxy, at least one silane, or at least one siloxane, or combinations thereof. In one aspect, the coating comprises polytetrafluoroethylene.

In one aspect, the filtration medium has a thickness of at least about 0.1 inches. In another aspect, the filtration medium has a thickness of less than about 0.5 inches. In one aspect, the filtration medium has a permeability of at least about 10 cfm/$ft^2$ according to ASTM D737. In one aspect, the filtration medium has a tensile strength of at least about 200 lbf/2 inches according to ASTM D5035. In one aspect, the filtration medium has a MIT Flex count of at least about 300,000 relative to the width of the filtration medium. In another aspect, the first woven fabric or the second woven fabric has a MIT Flex count of at least about 1000 relative to the width of the first woven fabric or second woven fabric. In one aspect, the first woven fabric or the second woven fabric has a MIT Flex count of up to about 8000 relative to the width of the first woven fabric or second woven fabric.

In one aspect, the filtration medium further comprises a membrane coupled to the first woven fabric, the second woven fabric, or combinations thereof. In one aspect, the membrane comprises polytetrafluoroethylene, polyvinylidene fluoride, polyethylene, polypropylene, polyester, polycarbonate, polyvinylchloride, cellulose, cellulose derivatives, olefinic polymers, or combinations thereof. In another aspect, the membrane comprises polytetrafluoroethylene. In one aspect, the membrane has a thickness less than about 100 microns. In another aspect, the membrane has a thickness greater than about 1 microns.

A filtration system is provided. The filtration system comprises a flue gas inlet manifold, a flue gas outlet manifold; and at least one filtration apparatus positioned between the flue gas inlet manifold and the flue gas outlet manifold, the at least one filtration apparatus comprising the filtration medium of claim 1 disposed over a wire cage support.

In one aspect, the filtration medium is in the shape of a bag. In one aspect, the at least one filtration apparatus further comprises at least one support ring operatively coupled to the filtration medium.

In one aspect, the filtration medium comprises a pollutant absorbent layer comprising a plurality of activated carbon fibers treated with a mercury retention species, a first woven fiber glass fabric, a second woven fiber glass fabric and wherein the pollutant absorbent layer is positioned between the first woven fabric and the second woven fabric and wherein the pollutant absorbent layer is needled, stitch bonded, or adhered by an adhesive layer to the first woven fabric and the second woven fabric.

A method of producing a filtration medium is provided. The method comprises providing a pollutant absorbent layer comprising activated carbon fibers, positioning a first woven fabric adjacent to a first surface of the pollutant absorbent layer, positioning second a woven fabric adjacent to a second surface of the pollutant absorbent layer, and coupling the first woven fabric and the second woven fabric to the pollutant absorbent layer.

In one aspect, the first woven fabric and the second woven fabric are coupled to the pollutant absorbent layer by an adhesive layer, needling, stitch bonding, or combinations thereof.

In another aspect, the method further comprises applying a coating to at least one of a fluid inlet surface or a fluid outlet surface of the filtration medium. In one aspect, the method further comprises attaching a membrane to a fluid inlet surface of the filtration medium. In one aspect, the membrane comprises polytetrafluoroethylene.

In one aspect, the method further comprises treating the pollutant absorbent layer with an aqueous solution comprising a metal halogen salt. In one aspect, the metal halogen salt comprises zinc chloride, zinc bromide, potassium chloride, potassium bromide, potassium iodide, or combinations thereof.

These and other embodiments are described in greater detail in the detailed description which follows.

DETAILED DESCRIPTION

Figure 1:
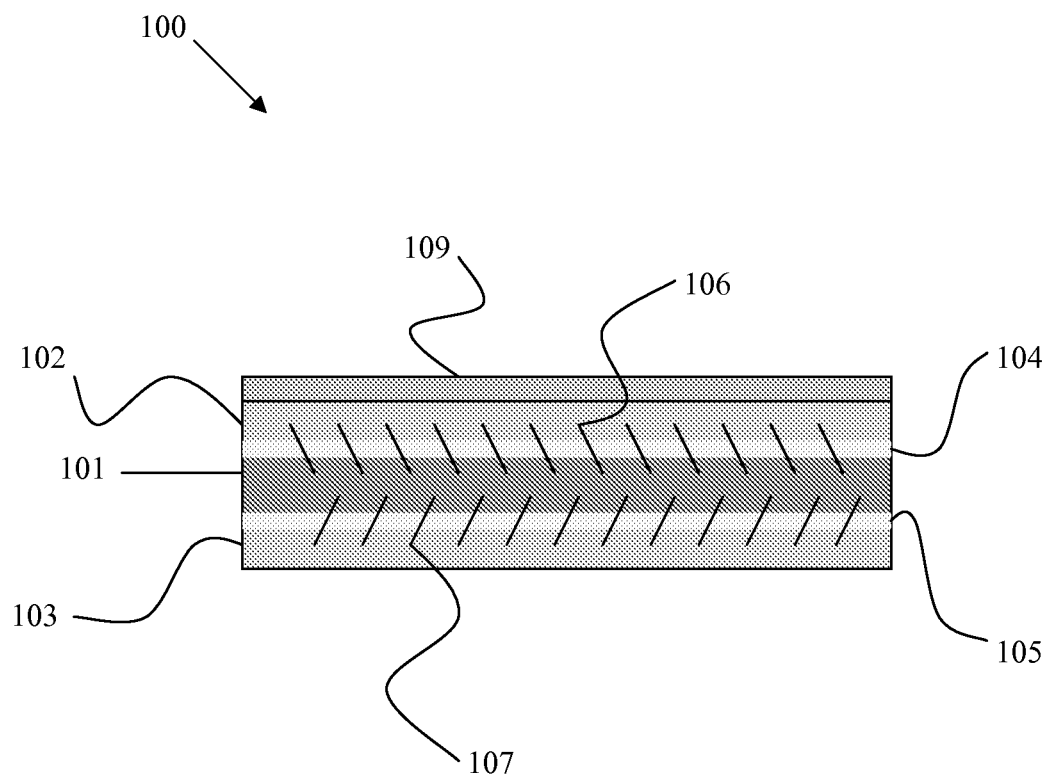
FIG. 1 illustrates a cross-sectional view of a filtration medium according to one embodiment of the present invention

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

In one aspect, the present invention provides filtration media that can be used, for example, in the treatment of flue gas streams. In some embodiments, filtration media described herein are operable to remove one or more pollutants from a flue gas stream including, but not limited to, mercury and/or other heavy metals.

A filtration medium, in some embodiments, comprises a pollutant absorbent layer comprising activated carbon fibers, a first woven fabric and a second woven fabric, wherein the pollutant absorbent layer is positioned between and coupled to the first woven fabric and the second woven fabric. In some embodiments, the pollutant absorbent layer is coupled to the first woven fabric by a first adhesive layer. In some embodiments, the pollutant absorbent layer is coupled to the second woven fabric by a second adhesive layer.

In some embodiments, the pollutant absorbent layer is coupled to the first woven fabric and/or the second woven fabric by needling. In some embodiments, the pollutant absorbent layer is coupled to the first woven fabric and/or or the second woven fabric by stitch bonding.

In some embodiments, the pollutant absorbent layer is coupled to the first woven fabric and/or the second woven fabric by any combination of adhesive layer(s), needling or stitch bonding. For example, the first woven fabric and/or the second woven fabric can be coupled to the pollutant absorbent layer by a needling and then stitch bonding.

In some embodiments, a filtration medium can further comprise a coating and/or membrane on a fluid inlet surface and/or a fluid outlet surface, such as a flue gas inlet surface or a flue gas outlet surface. In some embodiments, a coating or membrane can comprise one or more polymeric materials.

FIG. 1 illustrates a cross-sectional view of a filtration medium according to one embodiment of the present invention. The filtration medium (100) of FIG. 1 comprises a pollutant absorbent layer (101) comprising activated carbon fibers positioned between and coupled to a first woven fabric (102) and a second woven fabric (103). In the embodiment illustrated in FIG. 1, the first woven fabric (102) is coupled to the pollutant absorbent layer (101) by a first adhesive layer (104). Moreover, the second woven fabric (103) is coupled to the pollutant absorbent layer (101) by a second adhesive layer (105).

The first woven fabric (102) and the second woven fabric (103) are also needled to the pollutant absorbent layer (101). In being needled, fibers (106) from the first woven fabric (102) and fibers (107) from the second woven fabric (103) penetrate through the first and second adhesive layers (104, 105) and into the pollutant absorbent layer (101). In some embodiments, the needled fibers (106, 107) are at least partially coated with adhesive from the adhesive layers (104, 105) during the needling operation thereby providing increased binding interactions with the fibers of the pollutant absorbent layer (101).

As described further herein, the adhesive of the adhesive layers (104, 105), in some embodiments, is in an uncured or partially cured state during the needling operation. In some embodiments, fibers (106, 107) from the first and second woven fabrics (102, 103) are at least partially coated with the uncured or partially cured adhesive during the needling operation. The filtration medium (100) is subsequently exposed to conditions to cure the adhesive thereby permitting the at least partially adhesive coated fibers (106, 107), in some embodiments, to form chemical binding interactions with fibers of the layer or layers into which the fibers (106, 107) are needled. The chemical binding interactions, in some embodiments, can supplement mechanical interlocking of the needled fibers (106, 107) to increase the structural integrity of the filtration medium (100).

In some embodiments, fibers (not shown) from the first woven fabric (102) penetrate through the first and second adhesive layers (104, 105) and into the second woven fabric (103). In some embodiments, such fibers penetrate through the second woven fabric (103) and protrude from the exterior surface of the second woven fabric (103).

In some embodiments, fibers (not shown) from the second woven fabric (103) penetrate through the second and first adhesive layers (105, 104) and into the first woven fabric (102). In some embodiments, such fibers penetrate through the first woven fabric (102) and protrude from the exterior surface of the first woven fabric (102).

In other embodiments, a pollutant absorbent layer may be coupled to woven fabrics to form a filtration medium using an adhesive layer only, by needling only, by an adhesive layer on one portion and needling on another portion, or by other combinations of adhesive and needling, or by other techniques.

In some embodiments, a filtration medium including, for example, the embodiment of a filtration medium (100) illustrated in FIG. 1, further comprises a coating (not shown) on surfaces of the first and second woven fabrics (102, 103) which, in some embodiments, can inhibit degradation of the filtration medium (100) by enhancing abrasion resistance of fibers protruding from the surfaces of the first and second woven fabrics (102, 103) resulting from needling operations.

In some embodiments, a filtration medium including, for example, the embodiment of a filtration medium (100) illustrated in FIG. 1, can further comprise a membrane (109) coupled to the exterior surface of the first woven fabric (102). In some embodiments, the membrane (109) can be a non-stick or repellant to particles in a fluid stream thereby inhibiting particle accumulation on the exterior surface of the first woven fabric (102) and assisting in cleaning of the filtration medium (100).

In some embodiments, and as discussed further below, a filtration medium (or certain components of the medium) can have a desirable gas or air permeability. Unless otherwise indicated, as used herein, gas permeability or air permeability values mentioned herein were measured using the ASTM D737 standard.

As noted above, in some embodiments, one or more of the first woven fabric, the second woven fabric, the pollutant absorbent layer, and/or other material layers may be needled together. Needling comprises passing materials through a needling device wherein a plurality of barbed needles are reciprocated up and down so as to penetrate the strands in the material (i.e. in the fabric, pollutant absorbent layer, other material layers, etc.) and thereby entangle them with one another.

The layers to be needled during assembly of a filtration medium can be needled using techniques known to those of ordinary skill in the art. Such techniques are further described in U.S. Pat. No. 3,713,962 (Ackley), U.S. Pat. No. 4,277,531 (Picone), U.S. Pat. No. 4,404,717 (Neubauer, et al.), and U.S. Pat. No. 4,964,891 (Schaefer), which are hereby incorporated by reference. In general, the needling conditions (including, for example, needle size) should generally be selected so as to provide adequate mechanical interlocking between the layers while generally seeking to avoid the presence of residual large holes in the filtration medium (e.g., holes that might permit large particulate matters in a gas stream to pass entirely through the filtration medium). Machines that can act as a suitable needling apparatus can be purchased from a variety of commercial suppliers including, for example, needling apparatuses from DILO Group, Germany. In some embodiments, the needles used in needling can be a small gauge needle, for example a 40 gauge needle. Suitable needles, for use in some embodiments, are model number 609901 needles from Groz-Beckert USA.

I. Woven Fabric

Turning now to individual components that might be used in filtration media, filtration media described herein comprise a first woven fabric and a second woven fabric.

In some embodiments, a woven fabric suitable for use in filtration media described herein comprises glass fibers. Glass fibers suitable for use in the woven fabric can comprise any glass fiber not inconsistent with the objectives of the present invention. In some embodiments, suitable glass fibers comprise E-glass fibers, C-glass fibers, ECR glass fibers, S-glass fibers, boron-free glass fibers or mixtures thereof. In some embodiments, a woven fabric can be formed from D75 or D150 E-glass fiber glass strands.

In some embodiments, a woven fabric of a filtration medium described herein comprises synthetic polymeric fibers. Suitable synthetic polymeric fibers, in some embodiments, comprise acrylics, polyesters, polyamides, polyaramids, polyolefins, polyphenylene sulfide, polybenzimidazole, polyvinyl chloride, polyimides, carbon fibers, polyetherimide, fluoropolymers or mixtures thereof. In some embodiments, synthetic polymeric fibers comprise various constructions including various monocomponent and bicomponent constructions.

In some embodiments, a woven fabric comprises natural fibers. Suitable natural fibers, in some embodiments, comprise cellulosics and derivatives thereof. Additionally, in some embodiments, a woven fabric of a filtration medium described herein comprises inorganic fibers outside the scope of glass fibers. Suitable inorganic fibers, in some embodiments, comprise silica fibers, alumina fibers, alumina-silicate fibers, alumina-boro-silicate fibers, basalt fibers or mixtures thereof.

In some embodiments, one or more fibers or yarn of a woven fabric of a filtration medium described herein is texturized. In some embodiments, a woven fabric of a filtration medium is formed from texturized fibers or yarns, non-texturized fibers or yarns or mixtures thereof. In some embodiments, fibers and/or yarns can be texturized according to techniques known to one of skill in the art.

In some embodiments, fibers of a woven fabric can have any diameter not inconsistent with the objectives of the present invention. Fibers of a woven fabric, in some embodiments, have an average diameter ranging from about 1 µm to about 30 µm. In some embodiments, fibers of a woven fabric have an average diameter ranging from about 2 µm to about 15 µm. In some embodiments, fibers of a woven fabric have an average diameter ranging from about 3 µm to about 10 µm or from about 5 µm to about 7 µm.

In some embodiments, a woven fabric comprises one or more binders or sizing compositions for the fibers. In some embodiments, suitable binders or sizing compositions are those generally used on glass fibers for woven applications. In some embodiments, binders comprise starch-oil binders or sizings, such as 610 or 8610 commercially available from PPG Industries of Pittsburgh, Pa.

Moreover, in some embodiments, a woven fabric can be subjected to post-formation treatments to enhance the resistance of the fabric to various chemical conditions, such as acid or alkaline attack. In some embodiments, a post-formation treatment can enhance the physical properties of the woven fabric, such as non-stick properties. A post-formation treatment can include exposing the woven fabric to a variety of chemical species such as polytetrafluoroethylene (PTFE), silicones, polyurethanes, epoxides, graphite or silanes or combinations thereof.

In some embodiments, a woven fabric of a filtration medium described herein has a thickness less than about 0.2 inch. A woven fabric, in some embodiments, has a thickness less than about 0.1 inch or less than about 0.05 inch. In some embodiments, a woven fabric has a thickness ranging from about 0.001 inch to 0.2 inch. In some embodiments, a woven fabric has a thickness ranging from about 0.002 inch to about 0.1 inch.

In some embodiments, a woven fabric has a weight of at least about 1 $oz/yd^2$. In some embodiments, a woven fabric has a weight of at least about 3 $oz/yd^2$. A woven fabric, in some embodiments, has a weight ranging from about 1 $oz/yd^2$ to about 30 $oz/yd^2$. In some embodiments, a woven fabric has a weight ranging from about 5 $oz/yd^2$ to about 25 $oz/yd^2$. In some embodiments a woven fabric has a weight ranging from about 1 $oz/yd^2$ to about 10 $oz/yd^2$. A woven fabric, in some embodiments, has a weight ranging from about 3 $oz/yd^2$ to about 12 $oz/yd^2$ or from about 4 $oz/yd^2$ to about 7 $oz/yd^2$.

In some embodiments, a woven fabric demonstrates a permeability or porosity that minimizes pressure drop across the fabric and/or assembled filtration medium. A woven fabric, in some embodiments, has a permeability or porosity that is suitable for use in industrial flue gas filtration applications, such as pulse jet applications or reverse air applications. In some embodiments, a woven fabric achieves desirable permeability and/or porosity by displaying a loose open weave structure. In some embodiments, a woven fabric is provided as a scrim. Additionally, a woven fabric, in some embodiments, uses low twist or no twist texturized yarn to enhance permeability.

Unless otherwise specified herein, "cfm" is $ft^3$/min (cubic feet per minute). In some embodiments, a woven fabric has a permeability ranging from about 1 $cfm/ft^2$ to about 500 $cfm/ft^2$. Unless otherwise specified herein, permeability values provided herein are determined at 0.5 inches water gauge (wg)/water pressure differential and according to ASTM D737. A woven fabric, in some embodiments, has a permeability of at least about 10 $cfm/ft^2$ or a permeability of at least about 20 $cfm/ft^2$. In some embodiments, a woven fabric has a permeability of at least about 40 $cfm/ft^2$. In some embodiments, a woven fabric has a permeability ranging from about 25 $cfm/ft^2$ to about 100 $cfm/ft^2$. In some embodiments, a woven fabric has a permeability ranging from about 30 $cfm/ft^2$ to about 70 $cfm/ft^2$. In some embodiments, a woven fabric has a permeability ranging from about 40 $cfm/ft^2$ to about 60 $cfm/ft^2$.

In some embodiments, a woven fabric demonstrates a MIT Flex count relative to length and/or width of the fabric of at least about 1000. MIT Flex count values of woven fabrics and filtration media described herein are determined according to ASTM D2176. In some embodiments, a woven fabric has a MIT Flex count of at least about 2000. In some embodiments, a woven fabric has a MIT Flex count of at least about 3000 or at least about 4000. In some embodiments, a woven fabric has a MIT Flex count ranging from about 2000 to about 8000 or from about 3000 to about 7000.

In some embodiments, a woven fabric displays a Mullen Burst Strength of at least about 300 pounds per square inch (psi). Mullen Burst Strength values of woven fabrics described herein are determined according to ASTM D3786. In some embodiments, a woven fabric has a Mullen Burst Strength of at least about 400 psi. In some embodiments, a woven fabric has a Mullen Burst Strength of at least about 500 psi or at least about 600 psi. In some embodiments, a woven fabric has a Mullen Burst Strength ranging from about 100 psi to about 900 psi or from about 200 psi to about 700 psi.

In some embodiments, the first woven fabric and the second woven fabric are constructed independently of one another. In some embodiments, the first and second woven fabrics are constructed with reference to one another. The first woven fabric and the second woven fabric, in some embodiments, can have differing constructions and/or properties. In some embodiments, the first woven fabric and the second woven fabric can have the same or substantially the same properties.

II. Pollutant Absorbent Layer

A filtration medium described herein comprises a pollutant absorbent layer comprising activated carbon fibers. The pollutant absorbent layer, in some embodiments, is operable to remove one or more pollutants from a flue gas stream including, but not limited to, mercury and/or heavy metals. Moreover, in some embodiments, a pollutant absorbent layer of flue gas filtration medium described herein is operable to retain the absorbed pollutant indefinitely or for a desired time period. In some embodiments, a pollutant absorbent layer is operable to retain one or more pollutants when exposed to a variety of environmental conditions such as elevated temperatures associated with flue gas filtration applications.

Activated carbon fibers, in some embodiments, are produced from one or more synthetic polymeric fibers. In some embodiments, synthetic polymeric fibers suitable for producing activated carbon fibers can comprise polyacrylonitrile fibers (PAN), phenolic fibers or polyvinyl alcohol fibers. In some embodiments, activated carbon fibers are produced from one or more natural fibers. Natural fibers suitable for producing activated carbon fibers, in some embodiments, can comprise cellulosic fibers or rayon precursors.

In some embodiments, synthetic polymeric fibers and/or natural fibers are carbonized to produce activated carbon fibers. In some embodiments, synthetic polymeric and/or natural fibers are fully carbonized or partially carbonized. In one embodiment, for example, PAN fibers are partially carbonized, comprising about 20% to about 30% nitrogen from the precursor PAN.

In some embodiments, activated carbon fibers that can be used in the pollutant absorbent layer are commercially available in mat form as product numbers TK1000 or TK1600 from Jiangsu Tonkang Special Fabric & Garments Co., Ltd. of China, as product numbers KJF1000, KJF1300, and KJF1500 from Jiangsu Kejing Carbon Fiber Co., Ltd. of Jiangsu, China, and as product numbers STF-1000, STF-1300, and STF-1500 from Jiangsu Sutong Carbon Fiber Co., Ltd. of Jiangsu, China.

In some embodiments, carbon fibers can be activated or further activated by various physical and chemical methods. In some embodiments, the physical methods commonly include the presence of carbon dioxide or water vapor under controlled atmospheres and at elevated temperatures. Alternatively, many activation procedures use dehydrating agents such as zinc chloride or phosphoric acid to accomplish activation at temperatures between about 400 to about 700° C. Potassium hydroxide can be used after activation, in some embodiments, to further open the pores in the carbon fibers resulting in a larger pore size distribution.

In some embodiments, the carbonized fibers are subjected to further chemical treatments such as exposure to solutions of zinc chloride, potassium hydroxide and/or phosphoric acid to enhance the absorbent response of the fibers to specific species in the flue gas, such as mercury. In some embodiments, residues from the activation process can also be useful as mercury retention species. For example, in some embodiments, the carbonized fibers (in mat form or otherwise) can be exposed to solutions of zinc chloride as an activating agent. Residues of the zinc chloride are then capable of oxidizing and retaining mercury in the activated carbon in some embodiments. In some embodiments, for example, activated carbon fibers comprise zinc in an amount ranging from about 0.25 weight percent to about 6 weight percent.

Activated carbon fibers of a pollutant absorbent layer can have any dimension not inconsistent with the objectives of the present invention. In some embodiments, activated carbon fibers can have an average diameter ranging from about 10 nm to about 50 μm. In some embodiments, activated carbon fibers can have an average diameter ranging from about 100 nm to about 30 μm. Activated carbon fibers, in some embodiments, can have an average diameter of at least about 1 μm. In some embodiments, activated carbon fibers can have an average diameter ranging from about 1 μm to about 20 μm or from about 5 μm to about 15 μm. In some embodiments, activated carbon fibers are produced from synthetic polymeric and/or natural fiber derivatives produced by electrospinning techniques, such as those disclosed in United States Patent Application Publications 2008/0207798 and 2009/0102100, the disclosures of which are hereby incorporated by reference in their entireties.

In some embodiments, activated carbon fibers can also be treated with a retention species operable to inhibit or preclude the desorption or release of one or more pollutants (e.g., mercury) captured by the fibers during flue gas filtration. In some embodiments, for example, activated carbon fibers can be impregnated with various forms of sulfur, chlorine, bromine and/or iodine including, for example, elemental sulfur, to inhibit or preclude the desorption or release of mercury captured from a flue gas stream.

In some embodiments, a pollutant absorbent layer of a flue gas filtration medium described herein comprises at least 1% by weight sulfur. In some embodiments, a pollutant absorbent layer comprises sulfur in an amount ranging from about 2 weight percent to about 30 weight percent. In some embodiments, a pollutant absorbent layer comprises sulfur in an amount ranging from about 5 weight percent to about 15 weight percent. In some embodiments, a pollutant absorbent layer comprises sulfur in an amount ranging from about 18 weight percent to about 25 weight percent.

In some embodiments, a pollutant absorbent layer comprises bromine as a mercury retention species in an amount of at least about 1 weight percent. In some embodiments, a pollutant absorbent layer comprises bromine in an amount of at least about 5 weight percent. A pollutant absorbent layer, in some embodiments, comprises chlorine as a mercury retention species in an amount of at least about 1 weight percent. A pollutant absorbent layer, in some embodiments, comprises chlorine as a mercury retention species in an amount of at least about 5 weight percent. In some embodiments, a pollutant absorbent layer comprises iodine as a mercury retention species in an amount of at least about 1 weight percent. In some embodiments, a pollutant absorbent layer comprises iodine in an amount of at least about 5 weight percent.

In some embodiments, activated carbon fibers can be impregnated with noble metals including, for example, platinum, palladium, gold or silver or alloys thereof.

In some embodiments, to incorporate the retention species in the pollutant absorbent layer, the pollutant absorbent layer comprising activated carbon fibers (in mat form or otherwise) can be subjected to chemical treatment by metal salts comprising potassium chloride, potassium bromide, potassium iodide, zinc bromide, zinc chloride, or combinations thereof. In some embodiments, for example, the metal salts can be applied to a mat of activated carbon fibers as aqueous solutions comprising an amount of metal salt corresponding to between about 5 and about 100% of the carbon mass in the pollutant absorbent layer.

In some embodiments, the pollutant absorbent layer can be heated in an oven after treatment with the metal salts. In some such embodiments, the pollutant absorbent layer is heated for from about 1 to about 7 hours. In some such embodiments, the pollutant absorbent layer is heated at a temperature of about 150° C. to about 950° C. In some such embodiments, the pollutant absorbent layer is heated at between about 150° C. to about 250° C. or about 450° C. to about 500° C.

A mercury retention species when applied to activated carbon fibers in mat form, in some embodiments, is operable to inhibit or preclude desorption or release of captured mercury when the pollutant absorbent layer is heated to temperatures of up to about 550° F. In some embodiments, a mercury retention species applied to activated carbon fibers is operable to inhibit or preclude desorption or release of captured mercury when the pollutant absorbent layer is heated to temperatures of up to about 500° F. In some embodiments, a mercury retention species applied to activated carbon fibers is operable to inhibit or preclude desorption or release of captured mercury when the pollutant absorbent layer is heated to temperatures of up to about 400° F.

In some embodiments, a pollutant absorbent layer comprising activated carbon fibers has a surface area ranging from about 150 $m^2/g$ to about 2600 $m^2/g$. In some embodiments, a pollutant absorbent layer comprising activated carbon fibers has a surface area ranging from about 100 $m^2/g$ to about 600 $m^2/g$. In some embodiments, a pollutant absorbent layer comprising activated carbon fibers has a surface area ranging from about 1200 $m^2/g$ to about 1700 $m^2/g$. A pollutant absorbent layer comprising activated carbon fibers, in some embodiments, has a surface area ranging from about 1300 $m^2/g$ to about 1600 $m^2/g$. Surface areas of pollutant absorbent layers described herein are determined according to BET theory and techniques known to those of skill in the art. Unless otherwise stated, references to surface area herein reflect measurement of surface area according to ASTM D6556-10 Standard Method for Carbon Black Total and External Surface Area by Nitrogen Absorption.

The amount of mercury retention per gram of activated carbon fiber sorbent under static conditions of room temperature and saturated mercury vapor can be measured according to the following procedure: 50 mg of pollutant absorbent material was sealed into a fiberglass pocket that provided physical protection while allowing air flow. The sample was suspended by hanging in the vapor phase of a 1 quart jar with a quantity of liquid elemental mercury in the bottom. The jar was sealed and stored at room temperature for 7 days, after which, the sample was removed from the jar and placed in an airtight plastic bag. The sample was tested for total mercury content by Direct Mercury Analysis (DMA). DMA analysis was performed by IMR Test Labs using their CAP-054E (DMA) procedure. Unless otherwise stated herein, references to static mercury retention values herein (mercury retention per gram of activated carbon fiber sorbent) reflect measurements taken using this procedure.

In some embodiments, a pollutant absorbent layer demonstrates a capacity for absorbing at least about 50 mg of mercury per gram of the activated carbon fiber sorbent under static conditions of room temperature in saturated mercury vapor. Some embodiments of a pollutant absorbent layer can demonstrate a capacity for absorbing at least about 100 mg of mercury per gram of the activated carbon fiber sorbent under static conditions of room temperature in saturated mercury vapor, as measured using the same procedure. A pollutant absorbent layer, in some embodiments, can demonstrate a capacity for absorbing at least about 150 mg of mercury per gram of the activated carbon fiber sorbent under static conditions of room temperature in saturated mercury vapor, as measured using the same procedure. Some embodiments of a pollutant absorbent layer can demonstrate a capacity for absorbing at least about 200 mg of mercury per gram of the activated carbon fiber sorbent under static conditions of room temperature in saturated mercury vapor, as measured using the same procedure.

In some embodiments, a pollutant absorbent layer demonstrates a capacity for absorbing at least about 6 mg of mercury per gram of the activated carbon fiber sorbent over a period of five days under conditions of dynamic air flow at 350° F., the air comprising 11 ppb mercury vapor. In some embodiments, a pollutant absorbent layer demonstrates a capacity for absorbing at least about 10 mg of mercury, at least about 15 mg of mercury, at least about 20 mg of mercury, or at least about 25 mg of mercury per gram of the activated carbon fiber sorbent under conditions of dynamic dry nitrogen flow at 300° F. for 140 hours at a mercury vapor concentration of 75 ppb and a 4 fpm gas velocity through the sample.

A pollutant absorbent layer comprising activated carbon fibers can have any dimensions not inconsistent with the objectives of the present invention. In some embodiments, a pollutant absorbent layer has a thickness ranging from about 0.01 inch to about 0.2 inch. In some embodiments, a pollutant absorbent layer has a thickness ranging from about 0.02 inch to about 0.1 inch.

In some embodiments, a pollutant absorbent layer comprising activated carbon fibers has a gas permeability of at least about 20 $cfm/ft^2$. A pollutant absorbent layer, in some embodiments, has a gas permeability of at least about 25 $cfm/ft^2$. In some embodiments, a pollutant absorbent layer has a gas permeability ranging from about 15 $cfm/ft^2$ to about 120 $cfm/ft^2$ or from about 20 $cfm/ft^2$ to about 80 $cfm/ft^2$.

In some embodiments, the basis weight of a pollutant absorbent layer comprising activated carbon fibers ranges from about 1 $g/ft^2$ to about 40 $g/ft^2$. A pollutant absorbent layer, in some embodiments, has a basis weight ranging from about 5 $g/ft^2$ to about 30 $g/ft^2$. In some embodiments, a pollutant absorbent layer has a basis weight ranging from about 20 $g/ft^2$ to about 30 $g/ft^2$.

In some embodiments, the fibers comprising the pollutant absorbent layer have a diameter less than about 15 microns, which can allow for improved airflow and increased surface area, thereby improving sorption kinetics. Without being bound by theory, the improved sorption kinetics are believed to be due to increased collision frequency. In some embodiments, the fibers comprising the pollutant absorbent layer can have multi-lobal cross sections (e.g. fibers from viscose rayon), which also provide increased surface area.

III. Adhesive Layers

A filtration medium described herein, in some embodiments, comprises one or more adhesive layers disposed between the pollutant absorbent layer and the first woven fabric and/or the second woven fabric. In some embodiments, a filtration medium comprises a first adhesive layer disposed between the first woven fabric and the pollutant absorbent layer and a second adhesive layer disposed between the second woven fabric and the pollutant absorbent layer. An adhesive layer, in some embodiments, can increase the structural integrity of the filtration medium by increasing resistance of the filtration medium to delamination, moisture, acid and/or alkaline species.

An adhesive layer of a filtration medium can have any thickness not inconsistent with the objectives of the present invention. In some embodiments, an adhesive layer has a thickness less than about 5 µm. In some embodiments, an adhesive layer has a thickness ranging from about 1 µm to about 3 µm. An adhesive layer, in some embodiments, has a thickness less than about 1 µm.

In some embodiments, one or more adhesive layers do not occlude or substantially occlude the pore structure of any fabrics of the filtration medium thereby maintaining an acceptable or desirable gas flow though the filtration medium.

In some embodiments, an adhesive layer comprises one or more urethanes, silicones, fluorocarbons, epoxies, silanes or siloxanes or combinations thereof. In some embodiments, the first adhesive layer and the second adhesive layer of a filtration medium are constructed independent of one another. In some embodiments, the first adhesive layer and the second adhesive layer of a filtration medium are constructed with reference to one another. In some embodiments, the first and second adhesive layers comprise the same or substantially the same construction. In some embodiments, the first and second adhesive layers comprise different constructions.

IV. Fluid Inlet/Outlet Surface Coating and Membrane

In some embodiments, fluid inlet surfaces and/or fluid outlet surfaces of a filtration medium described herein can comprise a membrane. In some embodiments, a membrane can be operable to enhance the abrasion resistance and particle accumulation resistance of a gas inlet and/or outlet surface of the filtration medium. In some embodiments, the membrane is non-stick or repellant to particles in the fluid stream, and can facilitate cleaning of the filtration medium by techniques such as pulse jet or reverse air. Moreover, in some embodiments, a membrane can enhance the resistance of a fluid inlet and/or outlet surface to moisture, acid and/or alkaline species.

A membrane for fluid gas inlet and/or outlet surfaces of a filtration medium can have any thickness not inconsistent with the objectives of the present invention. In some embodiments, a membrane has a thickness less than about 100 µm. In some embodiments, a membrane has a thickness ranging from about 1 µm to about 50 µm. In some embodiments, a membrane has a thickness ranging from about 5 µm to about 25 µm or from about 10 µm to about 20 µm.

A membrane on a fluid inlet surface and/or fluid outlet surface does not occlude or substantially occlude the pore structure of the surface thereby maintaining acceptable or desirable gas flow characteristics though the surface and the filtration medium. In some embodiments, a membrane has a pore volume greater than about 80% and average pore sizes less than about 1 µm. In some embodiments, a membrane has an average pore size ranging from about 0.1 µm to about 0.5 µm. In some embodiments, a membrane has an average pore size ranging from about 0.2 µm to about 0.4 µm. Additionally, in some embodiments, a membrane has an air flow volume ranging from about $10 \text{ m}^3/\text{m}^2$ hr to about $500 \text{ m}^3/\text{m}^2$ hr.

In some embodiments, a membrane can comprise a fluoropolymer such as PTFE or polyvinylidene fluoride (PVDF). In some embodiments, a membrane can comprise polyethylene, polypropylene or other olefinic polymeric species. In some embodiments, a membrane can comprise polyester, polycarbonate or polyvinylchloride. A membrane, in some embodiments, can comprise cellulose or cellulose derivatives.

In some embodiments, the membrane can be coupled (e.g., laminated) at the fluid inlet surface. In some embodiments, the membrane can comprise polyester, vinyl polymers, polyethylene, cellulose fibers, fluorocarbons, or combinations thereof. In one embodiment, the membrane comprises expanded polytetrafluoroethylene (ePTFE). In some embodiments, the membrane coupled to a woven fabric layer by heat lamination using calendar rolls. In some embodiments, the membrane has a pore size and thickness that improves filtration efficiency of 2.5 micron particles (e.g. removes particles having a size of 2.5 microns or larger from a fluid stream). Suitable membranes for use in embodiments of the present invention can be obtained from and laminated onto the filtration medium by TTG Inc. of Higginsville, Mo.

In some embodiments, the filtration medium can comprise both a coating and a membrane coupled to the fluid inlet surface.

Additionally, in some embodiments, a coating is applied to fluid inlet surfaces and/or fluid outlet surfaces of a filtration medium prior to application of a membrane. In general, the coating can be applied to one or more layers of the filtration medium. In some embodiments, the coating can be operable to enhance the abrasion resistance of fibers protruding from a fluid inlet and/or outlet surface resulting from needling or stitch bonding the filtration medium.

The coating can provide one or more functions depending on the coating selected and the desired characteristics. For example, and without limitation, various coatings can provide abrasion resistance, can assist in bonding of layers, can provide chemical resistance, and/or can provide non-stick properties. Moreover, in some embodiments, a coating can enhance the resistance of an fluid inlet and/or outlet surface to moisture, acid and/or alkaline species.

In some embodiments, the coating can be a polymeric coating. In some embodiments, the coating can comprise one or more of the following: at least one urethane, at least one silicone, at least one fluorocarbon, at least one epoxy, at least one silane, or at least one siloxane, or combinations thereof. In some embodiments, urethane coatings can provide bonding, chemical resistance, and/or abrasion resistance. Fluorocarbons, in some embodiments can provide abrasion resistance and/or high temperature stability. In some embodiments, epoxies can provide bonding, chemical resistance, and/or abrasion resistance. Silicones, silanes and/or siloxanes can provide bonding. In some embodiments where the coating comprises fluorocarbons, the fluorocarbon can comprise polytetrafluoroethylene (PTFE). A PTFE coating, in some embodiments, can provide non-stick properties, abrasion resistance, and/or chemical resistance. For example, the non-stick property can be useful in promoting the easy release of fly ash particles when the filtration medium is subject to a cleaning cycle as well as enhancing the filtration of particles smaller than 2.5 µm. In some embodiments, coating materials that provide adhesive bonding can strengthen woven media and promote adhesion between a woven fabric and the absorbent layer, or other layers.

A polymeric coating for fluid gas inlet and/or outlet surfaces of a filtration medium can have any thickness not inconsistent with the objectives of the present invention. In some embodiments, a polymeric coating has a thickness less than about 5 µm. In some embodiments, a polymeric coating has a thickness ranging from about 1 μm to about 3 μm. A polymeric coating, in some embodiments, has a thickness less than about 1 μm.

In selecting a coating and a coating thickness, one should generally avoid coatings on a fluid inlet surface and/or fluid outlet surface that would generally occlude or substantially occlude the pore structure of the surface so as to maintain acceptable or desirable gas flow characteristics though the surface and the filtration medium.

V. Assembled Filtration Medium

In some embodiments, filtration media described herein are assembled by methods provided below. In some embodiments, a filtration medium described herein has a thickness ranging from about 0.05 inch to about 0.5 inch. In some embodiments, a filtration medium has a thickness ranging from about 0.1 inch to about 0.3 inch.

In some embodiments, a filtration medium described herein has a permeability of at least about 1 cfm/ft$^2$. In some embodiments, a filtration medium has a permeability ranging from about 5 cfm/ft$^2$ to about 70 cfm/ft$^2$. A filtration medium, in some embodiments, has a permeability ranging from about 10 cfm/ft$^2$ to about 50 cfm/ft$^2$. In some embodiments, a filtration medium has a permeability greater than about 70 cfm/ft$^2$.

A filtration medium, in some embodiments, has sufficient strength and/or mechanical integrity to permit use of the filtration medium in pulse jet or reverse air filtration applications. In some embodiments, a filtration medium described herein has a tensile strength of at least about 200 lbf/2" as determined according to ASTM D5035. In some embodiments, a filtration medium described herein has a tensile strength of at least about 225 lbf/2". In some embodiments, a filtration medium has a tensile strength ranging from about 200 lbf/2" to about 300 lbf/2".

A filtration medium described herein, in some embodiments, has a MIT Flex count of at least about 300,000 relative to the width of the filtration medium. In some embodiments, a filtration medium described herein has a MIT Flex count of at least about 800,000 relative to the length of the filtration medium.

As described herein, a filtration medium, in some embodiments, is needled on at least one side. In some embodiments, a filtration medium is needled on both sides. In some embodiments wherein a filtration medium is needled, one or more fibers from the first woven fabric penetrate into the pollutant absorbent layer. In some embodiments, one or more fibers from the first woven fabric penetrate through the pollutant absorbent layer and into the second woven fabric. In some embodiments, one or more fibers of the first woven fabric penetrate through the pollutant absorbent layer and second woven fabric and protrude from the exterior surface of the second woven fabric.

Additionally, in some embodiments, one or more fibers from the second woven fabric penetrate into the pollutant absorbent layer. In some embodiments, one or more fibers from the second woven fabric penetrate through the pollutant absorbent layer and into the first woven fabric. In some embodiments, one or more fibers of the second woven fabric penetrate through the pollutant absorbent layer and first woven fabric and protrude from the exterior surface of the first woven fabric.

In some embodiments of a filtration medium wherein one or more adhesive layers are present, needled fibers from the first and/or second woven fabrics can be at least partially coated with adhesive thereby permitting the needled fibers to form chemical binding interactions with fibers of the layer(s) into which the fibers are needled. In some embodiments, for example, adhesive of an adhesive layer is in an uncured or partially cured state during the needling operation permitting fibers from the first and/or second woven fabrics to become at least partially coated with the uncured or partially cured adhesive during the needling operation. The filtration medium is subsequently exposed to conditions to cure the adhesive thereby permitting the at least partially adhesive coated fibers, in some embodiments, to form chemical binding interactions with fibers of the layer or layers into which the fibers are needled. The chemical binding interactions, in some embodiments, can supplement mechanical engagement of the needled fibers to increase the structural integrity of the filtration medium.

A filtration medium described herein can have any needling pattern not inconsistent with the objectives of the present invention. In some embodiments, a filtration medium has at least about 100 punches/in$^2$. In some embodiments, a filtration medium has at least about 500 punches/in$^2$. In some embodiments, a filtration medium has about 100 punches/in$^2$ to about 3000 punches/in$^2$. In some embodiments, a filtration medium has about 500 punches/in$^2$ to about 2500 punches/in$^2$. In some embodiments, a filtration medium has about 1000 punches/in$^2$ to about 2000 punches/in$^2$.

As described herein, in some embodiments, a filtration medium can be stitch bonded. In some embodiments, a stitch yarn is passed through the filtration medium to provide increased mechanical integrity. Although the term stitch yarn is used in the present specification, it should be understood that, in some embodiments, a monofilament or single thread can be used in the stitch bonding of filtration media described herein. Depending on the type of stitch selected, the stitch yarn can pass upwardly and downwardly through the filtration medium, form loops and pass back through the loops to form stitches in the filtration medium.

In some embodiments, stitch yarns can comprise polyester yarns, textured polyester yarns, textured and untextured polypropylene yarns, textured and untextured nylon yarns, fiber glass, KEVLAR (polyaromatic amide), carbon or textured fiber glass. In some embodiments, polyester yarns are used as stitch yarns. Polyester may be desirable as a stitch yarn because polyester elongation and abrasion resistance make it operable to withstand the pathway from its supply through the stitch bonding machine. In some embodiments, the stitch yarn may be 70 to 150 denier textured or filament polyester yarn fed from beams or packages. Examples of suitable polyester yarns for use as stitch yarns in the present invention include, without limitation, 70 denier textured polyester yarns and 150 denier textured yarns, such as those commercially available from Unifi, Inc.

In some embodiments, a filtration medium can have any stitch bonding pattern not inconsistent with the objectives of the present invention. In some embodiments, a stitch bonded filtration medium has at least 5 stitches per inch. In some embodiments, a stitch bonded filtration medium has at least 7 stitches per inch. Moreover, in some embodiments, a stitch bonded filtration medium has a stitch length of at least 3 mm. In some embodiments, a stitch bonded filtration medium has a stitch length of at least 4 mm. A stitch bonded filtration medium, in some embodiments, has a stitch length ranging from about 1 mm to about 5 mm.

In some embodiments of a filtration medium wherein one or more adhesive layers are present, a stitch yarn can pass through the adhesive layer(s) and be at least partially coated with adhesive, thereby permitting the stitch yarn to form chemical binding interactions with fibers of the layer(s) through which the stitch yarn passes. In some embodiments, for example, adhesive of an adhesive layer is in an uncured or a partially cured state during the stitching operation. The filtration medium is subsequently exposed to conditions to cure the adhesive thereby permitting the at least partially coated stitch yarn, in some embodiments, to form chemical binding interactions with fibers of the layer or layers through which the yarn travels. The chemical binding interactions, in some embodiments, can supplement mechanical engagement of the stitch yarn to increase the structural integrity of the filtration medium.

A filtration medium described herein, in some embodiments, removes at least a portion of mercury present in a flue gas when the flue gas is passed through the filtration medium. The amount of mercury removed can be measured according to the following procedure: a mercury-laden gas stream is prepared by running dry nitrogen through a glass U-tube incorporating a mercury permeation tube commercially available from VICI (Valco Instruments Co. Inc.). The U-tube is held in a controlled-temperature oil bath to control the mass flow-rate of mercury from the permeation tube. The mercury-laden nitrogen stream is then passed through a length of tubing in a heated chamber to reach the desired test temperature. A sorbent sample is held in place by a commercially available membrane filter holder such as those used in the HPLC field, where the sample replaced the filter. The sample is exposed to the heated, mercury-laden nitrogen and the gas downstream of the sample is analyzed in real time by a cold vapor atomic absorption instrument to determine breakthrough concentration of mercury. The inlet concentration of mercury is measured using the same instrument both before and after the absorption experiment. References to mercury removal from a flue gas stream (or dynamic mercury removal) herein will refer to mercury removal according to this procedure unless stated otherwise.

A filtration medium described herein, in some embodiments, removes at least a portion of mercury present in a flue gas when the flue gas is passed through the filtration medium. In some embodiments, a flue gas filtration medium removes at least about 50 percent of mercury in a flue gas. In some embodiments, a flue gas filtration medium removes at least about 70 percent of mercury in a flue gas. A flue gas filtration medium, in some embodiments, removes at least about 90 percent or at least about 95 percent of mercury in a flue gas. In some embodiments, a flue gas filtration medium described herein removes up to 100 percent of mercury in a flue gas.

Moreover, in some embodiments, a flue gas filtration medium retains at least a portion of the captured or absorbed mercury for a time period of at least one year based on accelerated experiments. Acceleration is typically accomplished by increasing the mercury vapor concentration (typically up to 75 times the value commonly seen in industrial flue gas emissions). In some embodiments, a flue gas filtration medium retains at least a portion of the captured or absorbed mercury for a period of at least three years. In some embodiments, the portion of mercury retained will depend on various environmental conditions and factors to which the flue gas filtration medium is exposed. In some embodiments, a flue gas filtration medium described herein retains greater than 90% or greater than 95% of the mercury captured when the filtration medium is exposed to temperatures up to about 500° F. In some embodiments, a flue gas filtration medium described herein retains all or substantially all of the mercury captured when the filtration medium is exposed to temperatures up to about 500° F.

VI. Pulse Jet and Reverse Air Flue Gas Filtration System

In another aspect, some embodiments of the present invention provide a pulse jet flue gas filtration system comprising a flue gas inlet manifold, a flue gas outlet manifold and a plurality of filtration apparatus positioned between the inlet manifold and the outlet manifold, wherein at least one of the plurality of filtration apparatus comprises a wire cage support and a filtration medium disposed over the wire cage support. The filtration medium disposed over the wire cage support can comprise any one of the filtration media constructions described herein.

In some embodiments, a filtration medium described herein is in the shape of a bag for assembly over the wire cage support. A blowpipe and orifice is proximate the filtration medium for providing pulses of compressed air into the filtration medium for the removal of particles on the inlet surfaces of the filtration media.

Figure 2:
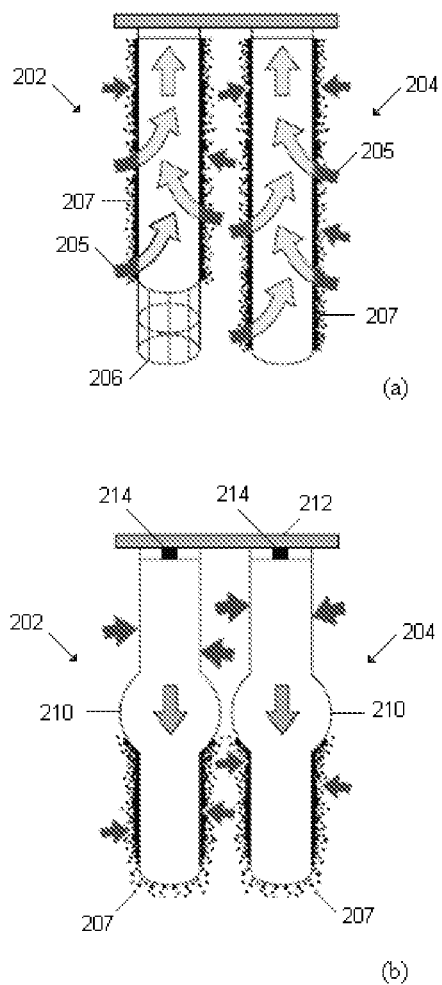
FIG. 2 illustrates filtration apparatus of a pulse jet flue gas filtration system according to one embodiment of the present invention.

FIG. 2 illustrates filtration apparatus of a pulse jet filtration system according to one embodiment of the present invention. FIG. 2(a) illustrates flue gas filtration media (202, 204) having a construction described herein executing filtration of a flue gas stream (205). As illustrated in FIG. 2(a), the filtration media (202, 204) are formed into bags for positioning over wire cage supports (206). The flue gas (205) flows through the filtration media (202, 204), thereby depositing various particulate matter (207) on surfaces of the filtration media (202, 204). As described herein, in some embodiments, the filtration media (202, 204) also removes one or more metal pollutants, such as mercury, upon passage of the flue gas (205) through the filtration media (202, 204).

FIG. 2(b) illustrates cleaning of the flue gas filtration media (202, 204). During the cleaning process, a pulse (210) of air or gas is provided by a blowpipe (212) and orifice (214) to the interiors of the gas filtration media (202, 204) causing the filtration media (202, 204) to expand and flex. The expansion and flexion of the filtration media (202, 204) dislodges the particulate matter (207) on surfaces of the filtration media (202, 204). The dislodged particulate matter (207) can be collected in hoppers (not shown) located beneath the filtration media (202, 204).

In another aspect, the present invention provides a reverse air flue gas filtration system comprising a flue gas inlet manifold, a flue gas outlet manifold and a plurality of filtration apparatus positioned between the inlet manifold and the outlet manifold, wherein at least one of the plurality of filtration apparatus comprises one or more support rings and a filtration medium coupled to the one or more support rings. The filtration medium coupled to the one or more support rings can comprise any one of the filtration media described herein.

Figure 3:
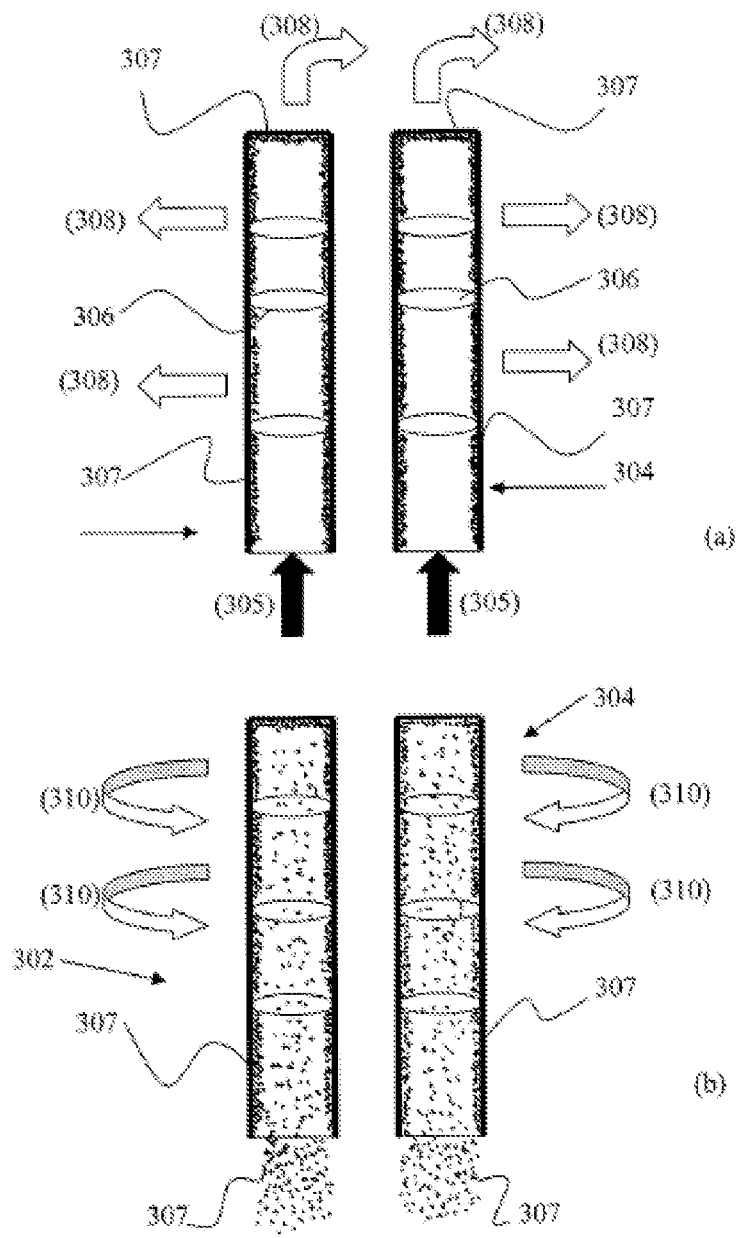
FIG. 3 illustrates a cross-sectional view of filtration apparatus of a reverse air filtration system according to one embodiment of the present invention.

FIG. 3 illustrates a cross-sectional view of filtration apparatus of a reverse air filtration system according to one embodiment of the present invention. FIG. 3(a) illustrates a cross-sectional view of flue gas filtration media (302, 304) having a construction described herein executing filtration of a flue gas stream (305). As provided in FIG. 3(a), the filtration media (302, 304) are formed into bags for coupling to ring supports (306). The flue gas (305) flows into the bag filtration media (302, 304) and passes through the bag filtration media (302, 304), thereby depositing various particulate matter (307) on the interior surfaces of the bag filtration media (302, 304). As described herein, in some embodiments, the filtration media (302, 304) also removes one or more metal pollutants, such as mercury, upon passage of the flue gas (305) through the filtration media (302, 304). The filtered flue gas (308) exits the bag filtration media (302, 304).

FIG. 3(b) illustrates cleaning of the bag filtration media (302, 304). During the cleaning process, air or gas (310) is flowed in the reverse direction of the filtration operation. The air or gas (310) is flowed through the exterior of the bag filtration media (302, 304) and into the interior of the bag filtration media (302, 304). The flow of air or gas (310) from the exterior to the interior at least partially collapses the bag filtration media (302, 304) and loosens and dislodges particulate matter (307) accumulated on the interior surfaces of the filtration media (302, 304). The dislodged particulate matter (307) can be collected in hoppers (not shown) located beneath the filtration media (302, 304).

In some embodiments, filtration media described herein can find application in gas filtration systems in addition to pulse jet and reverse air.

VII. Methods of Producing Filtration Media

In another aspect, the present invention provides methods of producing filtration media. In some embodiments, a method of producing a filtration medium comprises providing a pollutant absorbent layer comprising activated carbon fibers, providing a first woven fabric and a second woven fabric, positioning the pollutant absorbent layer between the first woven fabric and the second woven fabric and coupling the pollutant absorbent layer to the first woven fabric and the second woven fabric.

In some embodiments, the pollutant absorbent layer is coupled to first woven fabric and the second woven fabric by needling. In some embodiments, the filtration medium is needled from both sides such that fibers of the first woven fabric protrude from the exterior surface of the second woven fabric, and fibers from the second woven fabric protrude from the from the exterior surface of the first woven fabric. A polymeric coating, in some embodiments, is applied to surfaces of the first and/or second woven fabric to enhance the abrasion resistance of fibers protruding from the surfaces and to increase the mechanical integrity of the filtration medium. The coating can have any of the properties described in Section IV hereinabove.

In some embodiments, a membrane is subsequently coupled to the surface of the first woven fabric and/or the second woven fabric. In some embodiments, a membrane is only coupled to the woven fabric on the fluid stream inlet side of the filtration medium. A membrane, in some embodiments, is coupled to a surface of a woven fabric by lamination techniques, heat lamination techniques.

In some embodiments of methods of producing a filtration medium, a first adhesive layer is present between the first woven fabric and the pollutant absorbent layer and/or a second adhesive layer is present between the second woven fabric and the pollutant absorbent layer. In some embodiments, an adhesive layer is applied to a side of the first woven fabric and/or a side of the second woven fabric prior to engagement of the first and second woven fabrics with the pollutant absorbent layer. Alternatively, in some embodiments, an adhesive is applied to a first and/or second side of the pollutant absorbent layer prior to engagement of the first and second woven fabrics with the pollutant absorbent layer.

In some embodiments, a filtration medium comprising one or more adhesive layers between the pollutant absorbent layer and the first woven fabric and/or the second woven fabric is subsequently needled. In some embodiments, the adhesive of an adhesive layer is in an uncured or partially cured state during the needling operation permitting fibers from the first and/or second woven fabrics to become at least partially coated with the uncured or partially cured adhesive during the needling operation. The filtration medium is subsequently exposed to conditions to cure the adhesive thereby permitting the at least partially adhesive coated fibers, in some embodiments, to form chemical binding interactions with fibers of the layer or layers into which the fibers are needled. In some embodiments, the adhesive is cured during the lamination of the membrane to one or more surfaces of the filtration medium.

The chemical binding interactions, in some embodiments, can supplement mechanical engagement of the needled fibers to increase the structural integrity of the filtration medium.

Moreover, in some embodiments of methods of producing a filtration medium, the pollutant absorbent layer is coupled to the first woven fabric and/or the second woven fabric by stitch bonding. Once the first woven fabric, second woven fabric and pollutant absorbent layer are stitched together as described herein, a polymeric coating, in some embodiments, is applied to surfaces of the first and/or second woven fabric to coat the stitching fibers and consolidate the fabric, thereby enhancing the mechanical integrity of the filtration medium.

In some embodiments, a membrane is subsequently coupled to the surface of the stitch bonded first woven fabric and/or the second woven fabric. In some embodiments, a membrane is only coupled to the woven fabric on the fluid stream inlet side of the filtration medium. A membrane, in some embodiments, is coupled to the surface of a woven fabric by lamination techniques.

In some embodiments of methods of producing a filtration medium, a first adhesive layer is present between the first woven fabric and the pollutant absorbent layer and/or a second adhesive layer is present between the second woven fabric and the pollutant absorbent layer. In some embodiments, a filtration medium comprising one or more adhesive layers between the pollutant absorbent layer and the first woven fabric and/or the second woven fabric is subsequently stitch bonded. In some embodiments, the adhesive of an adhesive layer is in an uncured or partially cured state during the stitch bonding operation permitting stitch yarn to become at least partially coated with the uncured or partially cured adhesive. The filtration medium is subsequently exposed to conditions to cure the adhesive thereby permitting the at least partially adhesive coated stitch yarn, in some embodiments, to form chemical binding interactions with fibers of the layer or layers through which the stitch yarn is needled. In some embodiments, the adhesive is cured during the lamination of the membrane to one or more surfaces of the filtration medium.

The chemical binding interactions, in some embodiments, can supplement mechanical engagement of the stitch yarns to increase the structural integrity of the filtration medium.

The filtration medium, in some embodiments, can perform well when subjected to ETS particulate testing according to ASTM D6830-02. In some embodiments, the filtration medium had a PM2.5 (g/dscm) of $<1.67 \times 10^{-5}$, an average residual $\Delta P$ (cm w.g.) ranging between 2.6 and 3.0, and with a number of cleaning cycles ranging between 95 and 110.

VIII. Methods of Treating a Flue Gas

In another aspect, the present invention provides methods of treating a flue gas. In some embodiments, a method of treating flue gas comprises providing a filtration medium described herein and flowing the flue gas through the filtration medium, wherein at least a portion of mercury in the flue gas is removed by the filtration medium. In some embodiments, at least 50 percent of the mercury in the flue gas is removed by the filtration medium. In some embodiments, at least 70 percent of the mercury in the flue gas is removed by the filtration medium. In some embodiments, at least 90 percent or at least 95 percent of the mercury in the flue gas is removed by the filtration medium. In some embodiments, all or substantially of the mercury in the flue gas is removed by the filtration medium.

In some embodiments, a method of treating a flue gas further comprises at least partially removing a particulate component of the flue gas stream when the flue gas stream is passed through the filtration medium. In some embodiments greater than 90 percent of the particulate component of the flue gas is removed. In some embodiments, all or substantially all of the particulate component of the flue gas is removed.

These and other embodiments of flue gas filtration media are further illustrated by the following non-limiting examples.

Example 1

Preparation of a Pollutant Absorbent Layer

A non-woven mat comprising PAN fibers was oxidized and annealed by placing between fiberglass sheets on a perforated tray in a muffle furnace preheated to 150° C. 5 scfh of house air was supplied into the furnace as a purge gas. The sample was heated at 2 C./min to 240° C., held at 240° C. for 2 hours, purged with 20 scfh $N_2$ for 30 minutes, heated to 350° C. at 2 C./min, held at 350° C. for 1 hour, then cooled to below 250° C. before removing from the oven and rapidly cooling.

The annealed PAN was further activated by soaking in a 9% aqueous solution of zinc chloride for 30 minutes, drying in a 120° C. convection oven for 18 hours, loading into a tube furnace preheated to 200° C., holding at 200° C. for 30 minutes under a nitrogen purge of 20 scfh, heating to 600° C. at a rate of 10 C./min, holding at 600° C. for 30 minutes, cooling to below 200° C. and removing. The treated sample was washed with a 0.5N HCl solution followed by DI water to remove unreacted zinc chloride.

The sample was evaluated by nitrogen porosimetry and determined to have a BET surface area of 381 $m^2/g$. The sample had a room temperature static mercury sorption under saturated mercury vapor after one week of 41 mg/g. Dynamic mercury sorption performed under forced flow conditions in air at 350° F. with 11 ppb mercury vapor yielded 6 mg/g uptake before loss in efficiency.

Example 2

Incorporation of a Mercury Retention Species

A sample of activated carbon fiber mat prepared in accordance with Example 1 was impregnated with elemental sulfur by combining with excess sulfur (20:1 sulfur to sample mass) in close contact in a crucible heated under a nitrogen environment to 500° C. at a rate of 10 C./min, held at 500° C. for 1 hour and cooled to below 200° C. before removal. Surface elemental analysis using X-ray fluorescence spectroscopy (XPS) determined that the sulfur uptake by the activated carbon mat was 11% by mass, with no change in visual appearance of the sample. Similar experiments at 400° C. and 600° C. yielded 10% and 6% respectively.

Example 3

Production of Needled Filtration Media

Six filtration media having a structure described herein were produced by needling a first woven fabric and a second woven fabric to a pollutant absorbent layer comprising activated carbon fibers as set forth in Table I.

TABLE I

Needling Operation, Pollutant Absorbent Layer and Woven Fabric Properties

| Sample | Needle Pattern | Punches (sq in) | Pollutant Layer Construction | Woven Fabric Design[1] | Woven Fabric Construction[2] | Warp Input[3] | Filling Input[4] |
|---|---|---|---|---|---|---|---|
| 1 | S. Up/ S. Down/ S. Up/S. Down | 1944 | Activated Carbon Fiber Mat (1) | Plain Weave | 44 × 15[5] | G75 | DE-37 Texturized |
| 2 | S. Up/ S. Down/ S. Up/S. Down | 1944 | Activated Carbon Fiber Mat (2) | Plain Weave | 44 × 15 | G75 | DE-37 Texturized |
| 3 | S. Up/ S. Down/ S. Up/S. Down | 1944 | Activated Carbon Fiber Mat (1) | Plain Weave | 44 × 20[6] | G75 | DE-37 Texturized |
| 4 | S. Up/ S. Down/ S. Up/S. Down | 1944 | Activated Carbon Fiber Mat (2) | Plain Weave | 44 × 20 | G75 | DE-37 Texturized |
| 5 | S. Up/S. Down/ S. Up/S. Down | 1944 | Activated Carbon Fiber Mat (1) | Plain Weave | 44 × 26[7] | G75 | DE-37 Texturized |
| 6 | S. Up/S. Down/S. Up/S. Down | 1944 | Activated Carbon Fiber Mat (2) | Plain Weave | 44 × 26 | G75 | DE-37 Texturized |

[1] Woven fabric design for the first and second woven fabrics needled to the pollutant absorbent layer.
[2] Woven fabric construction for the first and second woven fabrics needled to the pollutant absorbent layer.
[3] Warp input for the first and second woven fabrics needled to the pollutant absorbent layer.
[4] Filling input for the first and second woven fabrics needled to the pollutant absorbent layer.
[5] Woven Fabric Weight - 5.96 oz/yd²
[6] Woven Fabric Weight - 6.77 oz/yd²
[7] Woven Fabric Weight - 7.76 oz/yd²

The pollutant absorbent layer used in the fabrication of each filtration medium sample comprised a mat of activated carbon fibers produced from viscose rayon fiber. The activated carbon fibers had an average diameter of about 12.5 µm. Activated Carbon Fiber Mat (1) demonstrated a permeability of 29.66 cfm/ft² and had a thickness of 0.093 in. Activated Carbon Fiber Mat (2) demonstrated a permeability 24 cfm/ft² and a thickness of 0.144 in. The permeability values in Table II were determined at 0.5 water gauge (wg) according to ASTM D737.

The properties of the resulting filtration media are provided in Table II.

TABLE II

Assembled Filtration Media Properties

| Sample | Basis Wt. (oz/sq. yd.) | Thickness (in.) | Air Permeability (cfm/ft$^2$) |
|---|---|---|---|
| 1 | 18.81 | 0.254 | 48.69 |
| 2 | 20.31 | 0.260 | 39.12 |
| 3 | 20.92 | 0.278 | 34.06 |
| 4 | 22.34 | 0.261 | 28.37 |
| 5 | 23.06 | 0.246 | 23.68 |
| 6 | 24.19 | 0.246 | 22.08 |

Example 4

Production of Stitch bonded Filtration Media

A filtration medium having a structure described herein was produced by stitch bonding a first woven fabric and a second woven fabric to a pollutant absorbent layer comprising activated carbon fibers as set forth in Table III.

TABLE III

Stitch bonding Operation, Pollutant Absorbent Layer and Woven Fabric Properties

| Sample | Stitch Yarn | Stitches/inch | Stitch Length (mm) | Pollutant Layer Construction | Woven Fabric Construction[8] | Warp Input[9] | Filling Input[10] |
|---|---|---|---|---|---|---|---|
| 1 | 70 Denier polyester yarn | 5 | 4.2 | Activated Carbon Fiber Mat | 44 × 15[11] | G75 | DE-37 Texturized |

[8]Woven fabric construction for the first and second woven fabrics stitch bonded to the pollutant absorbent layer.
[9]Warp input for the first and second woven fabrics stitch bonded to the pollutant absorbent layer.
[10]Filling input for the first and second woven fabrics stitch bonded to the pollutant absorbent layer.
[11]Woven Fabric Weight - 5.96 oz/yd$^2$ The pollutant absorbent layer used in the fabrication of the filtration medium sample comprised a mat of activated carbon fibers produced from viscose rayon fiber. The activated carbon fibers had an average diameter of about 12.5 μm. The activated carbon fiber mat demonstrated a permeability of 29.66 cfm/ft$^2$ and had a thickness of 0.093 in. The permeability value was determined at 0.5 water gauge (wg) according to ASTM D737.

Example 5

A pollutant absorbent layer comprising a TK1600 carbon fiber mat (obtained from Jiangsu Tonkang Special Fabric & Garments Co., Ltd., China) was further treated by soaking it in 1% aqueous zinc chloride solution for 1 minute and drying in an oven with nitrogen purge gas for 1 hour at 200° C. The sample was measured to have a BET surface area of 1269 m$^2$/g according to ASTM D6556-10. Elemental analysis by x-ray photoelectron spectroscopy showed the sample to have 5.8 atom % of chlorine incorporated. Room temperature static mercury absorption was 69 mg of mercury per gram of carbon as measured by the procedure described in paragraph [0086] above.

Example 6

A pollutant absorbent layer comprising TK1600 carbon fiber mat (obtained from Jiangsu Tonkang Special Fabric & Garments Co., Ltd., China) was further treated by soaking it in 10% aqueous potassium bromide solution for 1 minute and drying in an oven with nitrogen purge gas for 6 hours at 475° C. The sample was measured to have a BET surface area of 558 m$^2$/g according to ASTM D6556-10. Elemental analysis by x-ray photoelectron spectroscopy showed the sample to have 4.0 atom % of bromine incorporated. Room temperature static mercury absorption was 68 mg of mercury per gram of carbon as measured by the procedure described in paragraph [0086] above.

Example 7

A pollutant absorbent layer comprising TK1600 carbon fiber mat (obtained from Jiangsu Tonkang Special Fabric & Garments Co., Ltd., China), roughly 6" by 12" in size was further treated by sprinkling with elemental sulfur powder uniformly over the surface in a mass ratio of about 1:1 carbon:sulfur. The carbon and sulfur were rolled into a tube shape and placed inside a 6" diameter quartz tube furnace, purged with dry nitrogen, and heated at 10° C./min up to a final temperature of 470° C. The sample was held at 470° C. for one hour before cooling and removing from the tube furnace. The sample was measured to have a BET surface area of 1268 m$^2$/g according to ASTM D6556-10. Elemental analysis by x-ray photoelectron spectroscopy showed the sample to have 9.3 atom % of sulfur incorporated into the surface. Room temperature static mercury absorption was 52 mg of mercury per gram of carbon as measured by the procedure described in paragraph [0086] above.

Example 8

A non-woven mat comprising PAN fibers was oxidized and annealed by placing it between fiberglass sheets on a perforated tray in a muffle furnace preheated to 150° C. 5 scfh of house air was supplied into the furnace as a purge gas. The sample was heated at 2° C./min to 240° C., held at 240° C. for 2 hours, purged with 20 scfh N$_2$ for 30 minutes, heated to 350° C. at 2° C./min, held at 350° C. for 1 hour, then cooled to below 250° C. before removing from the oven and rapidly cooling.

The annealed PAN mat was further activated by dipping in 5% aqueous zinc chloride solution for 1 minute followed by drying at 80° C. in a convection oven. The dried sample was then placed into a quartz tube furnace, purged with dry nitrogen, and heated at 10° C./min up to a final temperature of 900° C. The sample was held at 900° C. for 5 minutes before cooling and removing from the tube furnace. The sample was measured to have a BET surface area of 399 m$^2$/g according to ASTM D6556-10. Elemental analysis by x-ray photoelectron spectroscopy showed the sample to have 3.1 atom % of chlorine incorporated into the surface. Room temperature static mercury absorption was 148 mg of mercury per gram of carbon as measured by the procedure described in paragraph [0086] above.

Example 9

A sample of activated carbon fiber mat prepared in accordance with Example 1 was impregnated with elemental sulfur by combining with excess sulfur (20:1 sulfur to sample mass) in close contact in a crucible heated under a nitrogen environment to 500° C. at a rate of 10° C./min, held at 500° C. for 1 hour and cooled to below 200° C. before removal. Surface elemental analysis using X-ray fluorescence spectroscopy (XPS) determined that the sulfur uptake by the activated carbon mat was 11% by mass, with no change in visual appearance of the sample. Similar experiments at 400° C. and 600° C. yielded 10% and 6% respectively. BET surface area was measured to be 59, 235, and 220 m$^2$/g for the samples treated at 400, 500, and 600° C. respectively according to ASTM D6556-10. Room temperature static mercury absorption was measured to be 23, 22, and 19 mg of mercury per gram carbon for the samples treated at 400, 500, and 600° C., respectively, as measured by the procedure described in paragraph [0086] above.

Desirable characteristics, which can be exhibited by embodiments of the present invention, can include, but are not limited to, the provision of filtration media that can effectively remove pollutants from an air or gaseous stream; the provision of filtration media that can effectively remove mercury from an air or gaseous stream; the provision of filtration media that can effectively retain mercury or other pollutants that have been captured from an air or gaseous stream; the provision of filter media that can effectively remove and retain mercury from an air or gaseous stream at industrially relevant temperatures; the provision of filtration media that can effectively remove mercury or other pollutants from an air or gaseous stream while providing sufficient and/or desirable air or gas permeability; the provision of filtration media that can effectively remove mercury or other pollutants from an air or gaseous stream while providing sufficient and/or desirable mechanical properties; the provision of filtration media that can effectively remove mercury or other pollutants from an air or gaseous stream while having a sufficient or desirable lifespan; the provision of useful methods for assembling filtration media; the provision of useful methods for removing mercury or other pollutants from an air or gaseous stream; and others.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

That which is claimed is:

1. A filtration medium comprising:
   a pollutant absorbent layer comprising a mat comprising a plurality of activated carbon fibers;
   a first woven fabric; and
   a second woven fabric;
   wherein the pollutant absorbent layer is positioned between the first woven fabric and the second woven fabric, wherein the first woven fabric and the second woven fabric are fiber glass fabrics, and wherein the pollutant absorbent layer further comprises metal halide salts, metal hydroxides, inorganic acids, or combinations thereof.

2. The filtration medium of claim 1, wherein the pollutant absorbent layer is coupled to the first woven fabric and the second woven fabric.

3. The filtration medium of claim 1, wherein the pollutant absorbent layer is needled to the first woven fabric and the second woven fabric.

4. The filtration medium of claim 1, wherein the pollutant absorbent layer is coupled to the first woven fabric by a first adhesive layer.

5. The filtration medium of claim 4, wherein the adhesive layer at least partially coats the first woven fabric, the second woven fabric, or combinations thereof.

6. The filtration medium of claim 4, wherein the pollutant absorbent layer is coupled to the second woven fabric by a second adhesive layer.

7. The filtration medium of claim 1, wherein the pollutant absorbent layer is stitch bonded to the first woven fabric, the second woven fabric, or combinations thereof.

8. The filtration medium of claim 1, wherein the pollutant absorbent layer is coupled to the first woven fabric by an adhesive layer, needling, stitch bonding, or combinations thereof.

9. The filtration medium of claim 1, wherein one or more fibers from the second woven fabric penetrate through the pollutant absorbent layer and into the first woven fabric.

10. The filtration medium of claim 1, wherein the first woven fabric or the second woven fabric has a permeability of at least about 20 cfm/ft2 according to ASTM D737.

11. The filtration medium of claim 1, wherein the first woven fabric or the second woven fabric has a Mullen Burst Strength of at least 100 pounds per square inch according to ASTM D3786.

12. The filtration medium of claim 1, wherein the activated carbon fibers comprise synthetic polymeric fibers, natural fibers, or combinations thereof.

13. The filtration medium of claim 1, wherein the activated carbon fibers are partially carbonized.

14. The filtration medium of claim 1, wherein the pollutant absorbent layer comprises metal halide salt and the metal halide salt comprises zinc chloride, zinc bromide, or combinations thereof.

15. The filtration medium of claim 14, wherein the zinc chloride or zinc bromide is present in amount ranging from about 0.25 to about 6 weight percent zinc.

16. The filtration medium of claim 1, wherein the pollutant absorbent layer comprises metal halide salt and wherein the metal halide salt comprises potassium chloride, potassium bromide, potassium iodide, or combinations thereof.

17. The filtration medium of claim 1, wherein the activated carbon fibers further comprise at least one mercury retention species.

18. The filtration medium of claim 17, wherein the mercury retention species comprises bromine.

19. The filtration medium of claim 17, wherein the mercury retention species is present in an amount of at least 1 weight percent.

20. The filtration medium of claim 1, wherein the pollutant absorbent layer has a surface area of at least about 1000 m2/g as measured by ASTM D6556-10.

21. The filtration medium of claim 1, wherein the pollutant absorbent layer absorbs at least about 100 mg of mercury per gram of activated carbon fiber at room temperature in saturated mercury vapor.

22. The filtration medium of claim 1, wherein the filtration medium comprises a fluid inlet surface and a fluid outlet surface, and wherein at least one of the fluid inlet surface and the fluid outlet surface further comprises a coating.

23. The filtration medium of claim 22, wherein the coating comprises a non-stick coating.

24. The filtration medium of claim 22, wherein the coating comprises polytetrafluoroethylene.

25. The filtration medium of claim 1, wherein the filtration medium has a permeability of at least about 10 cfm/ft2 according to ASTM D737.

26. The filtration medium of claim 1, wherein the filtration medium has a MIT Flex count of at least about 300,000 relative to the width of the filtration medium.

27. The filtration medium of claim 1, further comprising a membrane coupled to the first woven fabric, the second woven fabric, or combinations thereof.

28. The filtration medium of claim 27, wherein the membrane comprises polytetrafluoroethylene.

29. A filtration system comprising:
a flue gas inlet manifold;
a flue gas outlet manifold; and
at least one filtration apparatus positioned between the flue gas inlet manifold and the flue gas outlet manifold, the at least one filtration apparatus comprising the filtration medium of claim 1 disposed over a wire cage support.

30. The filtration system of claim 29, wherein the filtration medium is in the shape of a bag.

31. A filtration medium comprising:
a pollutant absorbent layer comprising a mat comprising a plurality of activated carbon fibers treated with a mercury retention species;
a first woven fiber glass fabric; and
a second woven fiber glass fabric;
wherein the pollutant absorbent layer is positioned between the first woven fabric and the second woven fabric and wherein the pollutant absorbent layer is needled, stitch bonded, or adhered by an adhesive layer to the first woven fabric and the second woven fabric.

32. A method of producing a filtration medium comprising:
providing (1) a pollutant absorbent layer comprising a mat comprising a plurality of activated carbon fibers, and further comprising metal halide salts, metal hydroxides, inorganic acids, or combinations thereof, or (2) a pollutant absorbent layer comprising a mat comprising a plurality of activated carbon fibers treated with a mercury retention species;
positioning a first woven fiber glass fabric adjacent to a first surface of the pollutant absorbent layer;
positioning a second woven fiber glass fabric adjacent to a second surface of the pollutant absorbent layer; and
coupling the first woven fiber glass fabric and the second woven fiber glass fabric to the pollutant absorbent layer.

33. The method of claim 32, wherein the first woven fabric and the second woven fabric are coupled to the pollutant absorbent layer by an adhesive layer, needling, stitch bonding, or combinations thereof.

34. The method of claim 32, further comprising attaching a membrane to a fluid inlet surface of the filtration medium.

* * * * *